United States Patent Office 3,605,420
Patented Sept. 20, 1971

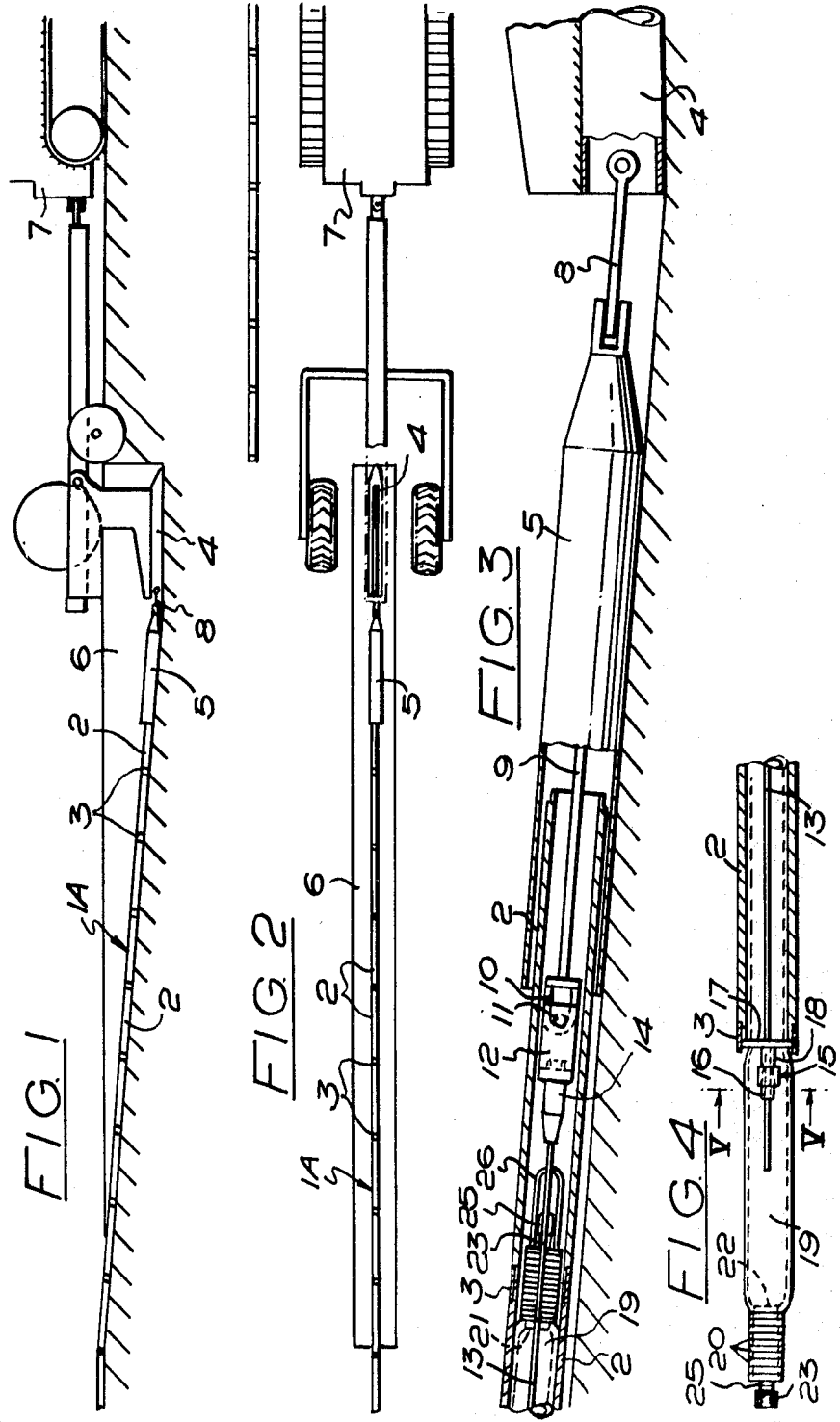

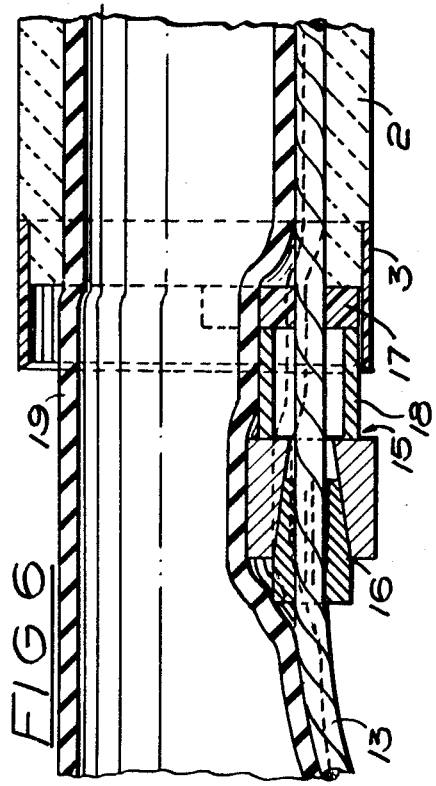
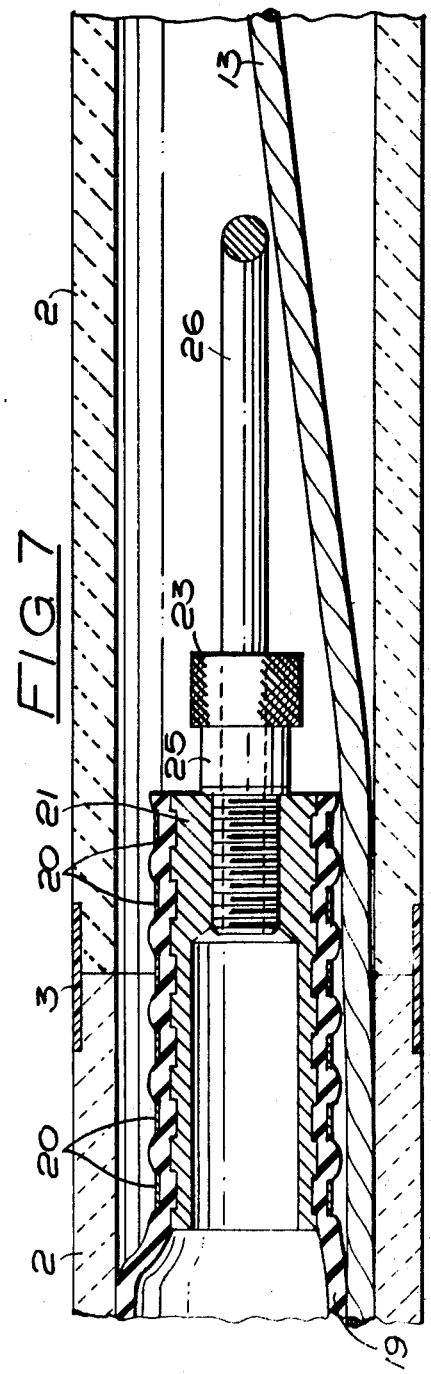
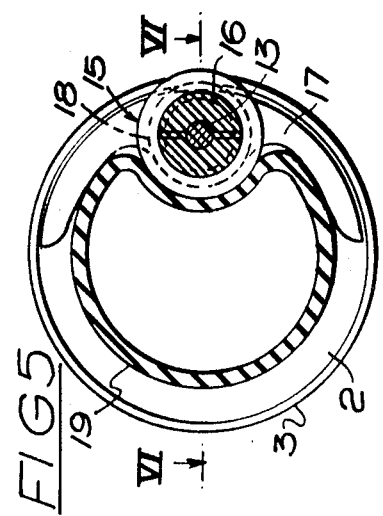

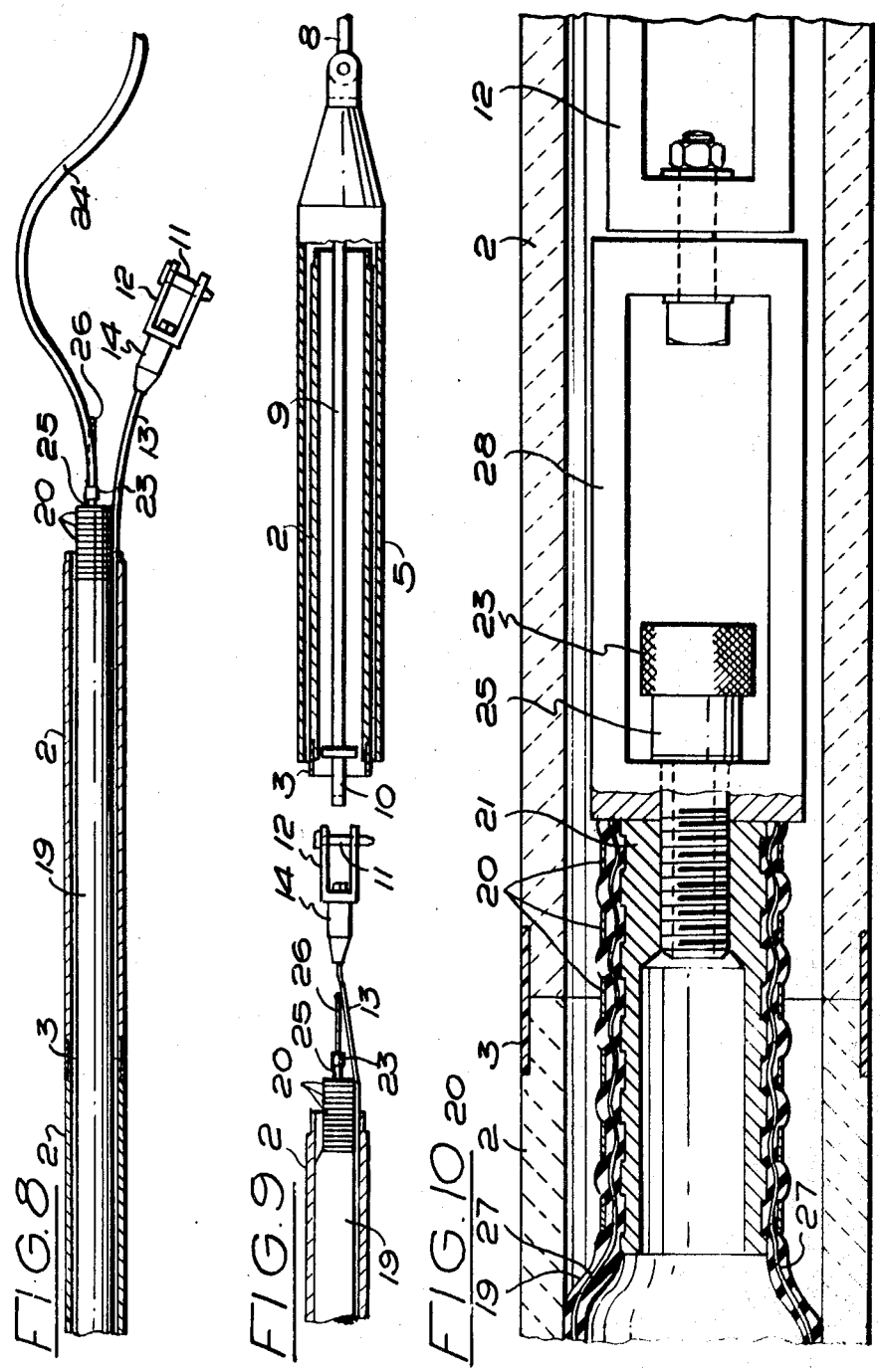

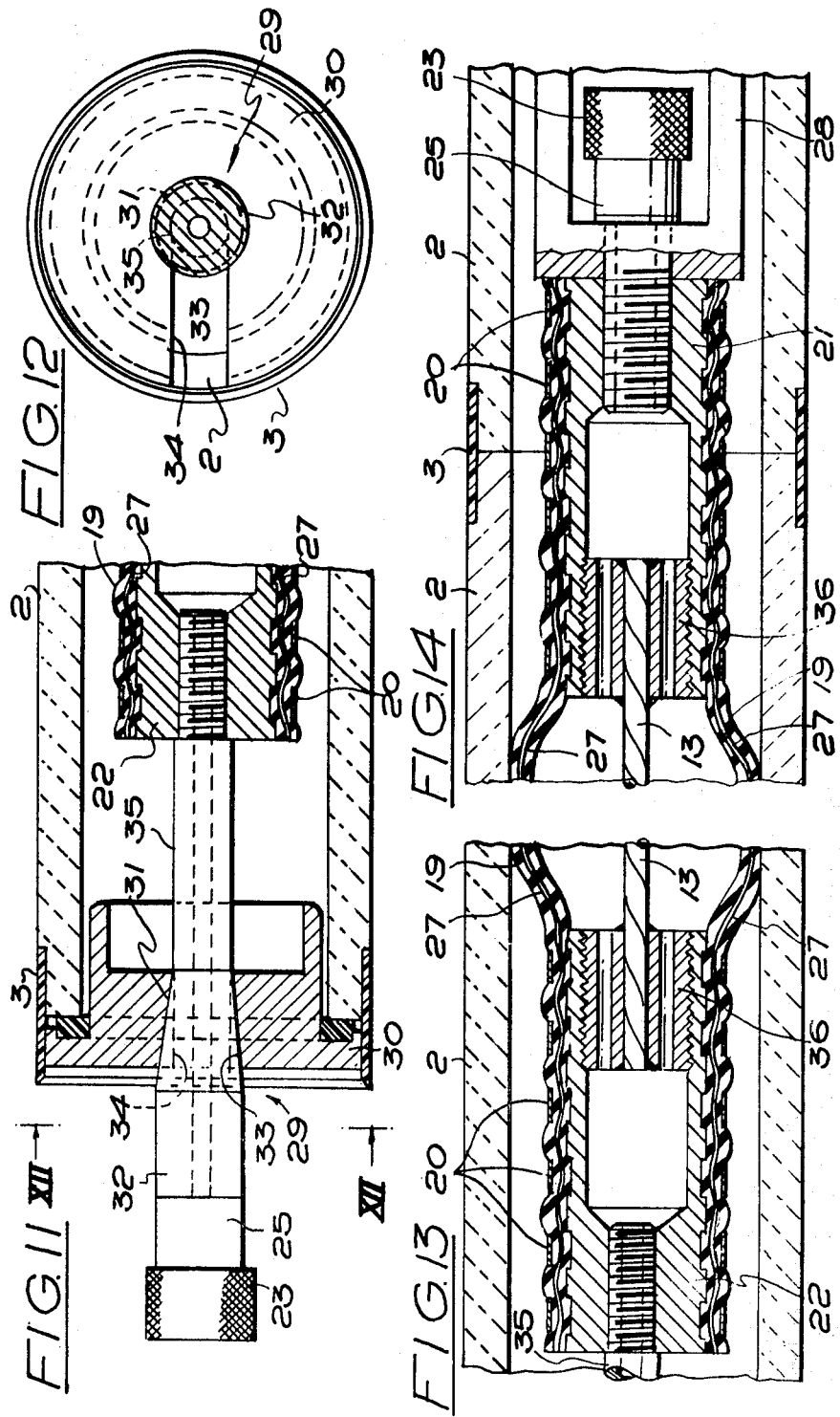

3,605,420
PIPING
John F. Booth, Peter J. Hinchliff, and Walerian Miszka, Stocksbridge, Sheffield, England, assignors to The Hepworth Iron Company Limited
Filed July 14, 1970, Ser. No. 54,697
Claims priority, application Great Britain, Aug. 5, 1969, 39,261/69; Oct. 20, 1969, 51,282/69; May 22, 1970, 24,860/70
Int. Cl. F16l *1/00*
U.S. Cl. 61—72.7                                                8 Claims

ABSTRACT OF THE DISCLOSURE

Piping is mole-ploughed into the ground by inserting into a length of piping, in particular clayware pipe-lengths abutting end-to-end and preferably connected by slightly resilient plastics sleeves, an inflatable bag which is expanded into gripping contact along the length of the piping, to enable the pull to mole-plough the piping into the ground to be distributed along the length of the piping, and the bag may be reinforced so as to take the pull from the mole-plough or it may be inserted along with a wire to be connected to the mole-plough, with the wire inside or, advantageously, outside the bag.

---

This invention relates to piping, more particularly underground piping, such as is used for sewers, drains and cable conduit, and is particularly concerned with the introduction of piping into the ground by the mole-ploughing method, which eliminates the need for trenching to receive the piping and then back-filling the trench, by pulling a length of piping into the ground behind a mole-plough.

According to the present invention, a method of mole-ploughing piping into the ground comprises inserting into a length of piping a deflated inflatable bag of a length to extend substantially the full length of the piping, admitting fluid under pressure into the bag to expand it into gripping contact along its length with the inside of the length of piping, pulling the bag by means of a mole-plough to pull the length of piping into and through the ground, deflating the bag, and withdrawing the bag from the piping.

The bag may be connected to the mole-plough, for which purpose the bag is provided with internal reinforcement permitting expansion but restricting extension of the bag and imparting sufficient strength to the bag to withstand the pull needed to mole-plough the length of piping into the ground.

Alternatively, a pulling rod, rope or wire (hereafter referred to simply as "wire") may be inserted into the length of piping along with the deflated bag, which need not necessarily be provided with reinforcement, and the wire attached to the mole-plough, so that the bag when inflated distributes along the whole length of the piping the load on the wire for pulling the length of piping into the ground. The wire preferably extends outside the bag, i.e., between the bag and the inside of the piping, so that in addition to being expanded into gripping contact along its length with the inside of the piping the bag also presses the wire into gripping contact with itself and the piping. The wire may be provided with an anchor, such as a cable clamp and a plate, to abut the trailing end of the length of piping, and the wire may be connected at its leading end to the bag, to facilitate the bag and the wire being inserted into the piping together.

While the invention is applicable to the mole-ploughing into the ground of any type of piping having sufficient flexibility to enter the ground at a slight angle and then run substantially parallel to the surface, e.g., plastics piping in a continuous length of such magnitude that without the distribution of the load it would be liable to buckle, the invention finds particularly advantageous application to piping consisting of clayware pipe-lengths abutting end-to-end, because of the reduction and possible elimination of risk of damage to the abutting ends of the pipe-lengths and the maintenance of alignment of the pipe ends. The pipe-lengths may merely abut, as in piping to form a surface water drain, or they may be connected by slightly resilient plastics sleeves fitting reduced spigots (at least on the trailing ends of the pipe-lengths), so as not to add to or afford appreciable additional resistance to pulling of the piping into the ground, and to reduce or possibly eliminate any risk of the sleeves being dislodged.

The invention also includes lengths of piping, each fitted with an inflatable bag, with or without internal reinforcement, and with or without a wire, inside or outside the bag, together with valve means for use in effecting inflation and deflation, and means for attachment to a mole-plough.

Three methods according to the invention for mole-ploughing into the ground piping consisting of clayware pipe-lengths, and equipment for carrying out these methods, will now be described, by way of example only, with reference to the accompanying drawings, in which FIG. 1 is a diagrammatic section showing a length of piping about to be mole-ploughed into the ground;

FIG. 2 is a plan of FIG. 1;

FIG. 3 is a part-sectional elevation, to a larger scale, of part of FIG. 1 in the region of the leading end of the piping, particularising one method according to the invention;

FIG. 4 is the corresponding part-sectional elevation in the region of the trailing end of the piping;

FIG. 5 is a section, to an even larger scale, taken from the line V—V of FIG. 4;

FIG. 6 is a fragmentary section taken from the line VI—VI of FIG. 5;

FIG. 7 is a corresponding fragmentary section in the region of the left hand end of FIG. 3;

FIGS. 8 and 9 are similar to FIG. 3, but illustrate earlier stages in the method;

FIG. 10 corresponds to FIG. 7, but particularises a second method according to the invention;

FIG. 11 is the corresponding section in the region of the trailing end of the piping;

FIG. 12 is a part-sectional elevation taken from the line XII—XII of FIG. 11; and FIGS. 13 and 14 are fragmentary sections corresponding to parts of FIGS. 11 and 10 respectively, particularising the third method according to the invention.

In FIGS. 1 and 2, which apply to all three methods particularised, piping 1A, consisting of clayware pipe-lengths 2 connected by plastics sleeves 3 is attached to a mole-plough 4 through a shield 5, which protects and guides the leading end of the piping through the bore formed by the mole-plough, as it is towed through the ground from a pilot trench 6 by a tractor 7. The length of piping 1A may be 100 yards or more, and when the mole-plough emerges with the leading end of the piping at another pilot trench (not shown) the mole-plough (and shield) is detached and attached to the leading end of another length of piping 1B, the trailing end of which is shown in FIG. 2. Successive lengths of piping mole-ploughed into the ground in this manner are readily connected to preceding lengths by means of plastic sleeves between the trailing and leading clayware pipe-lengths. As can also be seen in FIG. 3, the shield 5 is connected by a pivotal link 8 to the mole-plough 4, and the shield includes a draw-bar 9 with a shackle 10 releasably secured by a removable pin 11 to an adaptor 12 in the piping 1A, this connection to the mole-plough being common to all three methods. When attaching (or detaching) the draw-bar 9 the leading pipe-length 2 is slipped further inside the shield 5, as shown in FIG. 9.

FIGS. 3 to 9 show a wire 13 extending from a swivel 14 on the adaptor, right through the piping end and out of the trailing end. As can be seen in FIGS. 4 to 6, the trailing end of the wire 13 is provided with an anchor 15 comprising a cable with an anchor 15 comprising a cable clamp 16 and an arcuate plate 17 abutting the trailing end of the trailing pipe-length 2, the clamp being positioned clear of the sleeve 3 on that end of that pipe-length by a tubular distance-piece 18. The plate 17 is arcuate so that it can embrace, but be readily separable from, an inflatable bag 19 inserted into the piping whilst deflated along with the wire 13, with the wire outside the bag, i.e. between the bag and the inside of the piping.

The ends of the bag 19 are secured by straps 20 in sealing engagement with a pair of peripherally-grooved end fittings 21, 22, each of which is provided with a coupling 23 capable of quick connection to and release from a hose 24 (FIG. 8 only) from a supply of compressed air (not shown), and including a manually releasable non-return valve 25.

The leading end fitting 21 is provided with a shackle 26 enabling the bag 19 to be drawn through the piping by means of a threading cable (not shown), and the shackle 26 may be coupled up to the adaptor 12 to enable the wire 13 to be drawn through the piping simultaneously with the bag 19.

When the deflated bag and the wire extend through the length of piping (except for the detached leading pipe-length 2 inside the shield 5, as shown in FIG. 9), with the coupling 25 of the leading fitting 21 accessible for connecting the hose (see FIG. 8), the bag is inflated, and in addition to being expanded into gripping contact with the inside of the piping along its length (except for the leading pipe-length), the bag also presses the wire into gripping contact with itself and the piping. The coupling 25 of the trailing fitting 22 could be used alternatively for the inflation of the bag, especially if it proved to be more conveniently placed with respect to the hose 24 and/or the supply of compressed air.

After uncoupling the hose 24 from the coupling 23, the adaptor 12 is connected to the shackle 10 by the pin 11, and the leading pipe-length is pulled out from the shield 5 and connected to the main length of piping by a sleeve 3 (see FIG. 3), ready for pulling into the ground by the mole-plough 4.

As the length of piping is pulled into the ground the bag distributes along the whole length of the piping the load on the wire, the lead being transmitted partly from the wire to the bag and from the bag to the piping and partly directly from the wire to the piping.

Withdrawal of the bag 19 and the wire 13 can be readily effected (again by pulling the shackle 26 and the adaptor 12) when the bag has been deflated by manually releasing either of the non-return valves 25 in the couplings 25, as convenient, and the cable clamp 16 has been released, ready for use in a succeeding length of piping.

Referring again to FIGS. 1 and 2, it is clearly advantageous to have the piping 1B ready for pulling into the ground immediately the piping 1A has been disconnected from the mole-plough 4, for which purpose at least two sets of the portion of the equipment covered by reference numerals 12 to 26 (but excluding the hose 24) are required, one set being transferred from one length of piping to another (i.e., bag deflated, bag and wire withdrawn from one, bag and wire inserted in the other, and bag inflated) while an intermediate length of piping is being pulled into the ground. More than two sets will allow more comfortable time for effecting transfer of each set, because two or more lengths of piping would be in readiness at any one time.

The bag 19 may be reinforced, but this is not necessary if the material of the bag has sufficient strength in itself to resist bursting where the bag is not constrained within the piping (see FIG. 4) or if a pipe-length 2 should happen to burst (though this is most unlikely).

In the method particularised by FIGS. 10 to 12 the bag 19 is reinforced with longitudinal wires 27, the wire 13 and the shackle 26 are dispensed with, and the bag is connected to the mole-plough by a link 28 between the adaptor 12 and the leading end fitting 21 for the bag. The reinforcement 27 permits expansion of the bag but restricts extension, and imparts sufficient strength to the bag to withstand the pull needed to mole-plough the length of piping (including the leading pipe-length into which the bag does not extend) into the ground. Because of the absence of the wire 13 it proves convenient to gauge the length of the bag 19 so that its trailing end fitting 22 is within the trailing pipe-length (see FIG. 11), and to provide an anchor 29 comprising a plate 30 abutting the trailing end of the trailing pipe-length and a tapered portion 31 of a tubular stem 32 between the coupling 23 (and valve 25) and the end fitting 22, the tapered portion fitting a tapered hole 33 in the plate 30, and a slot 34 having a width giving clearance over a smaller diameter portion 35 of the stem extending radially from the tapered hole, for ready separation of the plate 30 from the stem 32 when the bag 19 has been deflated for withdrawal from the length of piping, after mole-ploughing into the ground.

In FIGS. 13 and 14, the bag 19 is again reinforced by wires 27, but a wire 13 is provided inside the bag and is connected at its ends only to the end fittings 21, 22 for the bag by ported plugs 36 screwed into the end fittings, so that part of the load for pulling the length of piping into the ground is not transmitted by the bag but by the wire, the end fittings, and the anchor 29 (as in FIG. 11) to the trailing end of the trailing pipe-length.

What we claim is:

1. A method of mole-ploughing piping into the ground comprising:
   inserting into a length of piping a deflated inflatable bag of a length to extend substantially the full length of piping;
   admitting fluid under pressure into the bag to expand it into gripping contact along its length with the inside of the length of piping;
   pulling the bag by means of a mole-plough to pull the length of piping into and through the ground;
   deflating the bag;
   and withdrawing the bag from the piping.

2. A method as in claim 1, wherein the bag is connected to the mole-plough, for which purpose the bag is provided with internal reinforcement permitting expansion but restricting extension of the bag and imparting sufficient strength to the bag to withstand the pull needed to mole-plough the length of piping into the ground.

3. A method as in claim 1, wherein a wire is inserted into the length of piping along with the deflated bag, and the wire is attached to the mole-plough, so that the bag when inflated distributes along the whole length of the piping the load on the wire for pulling the length of piping into the ground.

4. A method as in claim 3, wherein the wire extends outside the bag.

5. A method as in claim 3 wherein the wire is provided with an anchor to abut the trailing end of the length of piping.

6. A method as in claim 3 wherein the wire is connected at its leading end to the bag, to facilitate the bag and the wire being inserted into the piping together.

7. A method as in claim 1, wherein the piping consists of clayware pipe-lengths abutting end-to-end.

8. A method as in claim 7, wherein the pipe-lengths are connected by slightly resilient plastics sleeves fitting reduced spigots.

References Cited

UNITED STATES PATENTS

| | | | |
|---|---|---|---|
| 2,334,386 | 11/1943 | Cortella | 61—53.72 |
| 3,233,315 | 2/1966 | Levake | 254—29X |
| 3,335,574 | 8/1167 | Guild | 61—53.72 |
| 3,469,298 | 9/1969 | Pizzagalli | 29—252X |

JACOB SHAPIRO, Primary Examiner

U.S. Cl. X.R.

61—53.72; 254—29